(12) United States Patent
Guan et al.

(10) Patent No.: US 12,488,303 B2
(45) Date of Patent: Dec. 2, 2025

(54) SYSTEMS AND METHODS OF OPTIMIZING PACK SIZE AND CUSTOMER-FACING QUANTITY OF RETAIL PRODUCTS AT RETAIL FACILITIES

(71) Applicant: Walmart Apollo, LLC, Bentonville, AR (US)

(72) Inventors: Jackie L. Guan, Bentonville, AR (US); Juan P. Gomez, Bentonville, AR (US); Jingying Zhang, Beaumont, TX (US); Richard B. Ulrich, Bentonville, AR (US); Seon Ki Kim, Dublin, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 775 days.

(21) Appl. No.: 17/486,474

(22) Filed: Sep. 27, 2021

(65) Prior Publication Data
US 2023/0107702 A1    Apr. 6, 2023

(51) Int. Cl.
*G06Q 10/067* (2023.01)
*G06Q 10/0631* (2023.01)
(Continued)

(52) U.S. Cl.
CPC ..... *G06Q 10/067* (2013.01); *G06Q 10/06315* (2013.01); *G06Q 10/0633* (2013.01); *G06Q 10/087* (2013.01); *G06Q 30/0201* (2013.01)

(58) Field of Classification Search
CPC ........... G06Q 10/067; G06Q 10/06315; G06Q 10/0633; G06Q 10/087
See application file for complete search history.

(56) References Cited

U.S. PATENT DOCUMENTS 6,341,269 B1 * 1/2002 Dulaney ............ G06Q 30/0204
705/28
7,734,495 B2 * 6/2010 Klaubauf ......... G06Q 10/06315
705/7.33
(Continued)

OTHER PUBLICATIONS

Das, Lita, et al.; "Pack Size Effects On Retail Store Inventory And Storage Space Needs"; INFOR: Information Systems and Operational Research; May 19, 2021; Taylor and Francis Group; <https://doi.org/10.1080/03155986.2021.1918487>; 31 pages.

*Primary Examiner* — William S Brockington, III
*Assistant Examiner* — Tyrone E Singletary
(74) *Attorney, Agent, or Firm* — Fitch, Even, Tabin & Flannery, LLP

(57) ABSTRACT

Described are methods and systems for estimating an optimal product pack size and on-shelf customer facing quantity of the products in view of shelf capacity limitations of the shelves at a given retail store/product distribution center, with the aim of maximizing the total net profit of the store/distribution center. The systems and methods obtain inventory-related, retail facility product storage capacity-related, and product storage/handling-related data from one or more databases and estimate the net profit of multiple variations of pack size and customer-facing quantity for each product. Then, these results are processed via various inventory optimization algorithms obtained from one or more databases to estimate the pack size and customer-facing quantity for each of the products to be stocked at the retail facility that would be estimated to result in maximum net profit for the retail facility within a given period of time.

20 Claims, 4 Drawing Sheets

(51) Int. Cl.
*G06Q 10/0633* (2023.01)
*G06Q 10/087* (2023.01)
*G06Q 30/0201* (2023.01)

(56) References Cited

U.S. PATENT DOCUMENTS

| | | | |
|---|---|---|---|
| 11,403,574 B1* | 8/2022 | Rangarajan | G06Q 10/04 |
| 2002/0147666 A1* | 10/2002 | Baseman | G06Q 10/087 |
| | | | 705/28 |
| 2003/0220830 A1* | 11/2003 | Myr | G06Q 30/0245 |
| | | | 705/14.54 |
| 2007/0027745 A1* | 2/2007 | Ouimet | G06Q 10/06375 |
| | | | 705/7.31 |
| 2009/0271241 A1 | 10/2009 | Pratt | |
| 2011/0276364 A1* | 11/2011 | Bergstrom | G06Q 10/04 |
| | | | 705/7.29 |
| 2012/0179506 A1* | 7/2012 | McMains | G06Q 10/06315 |
| | | | 705/7.25 |
| 2014/0136271 A1* | 5/2014 | Rangarajan | G06Q 10/06315 |
| | | | 705/7.25 |

* cited by examiner

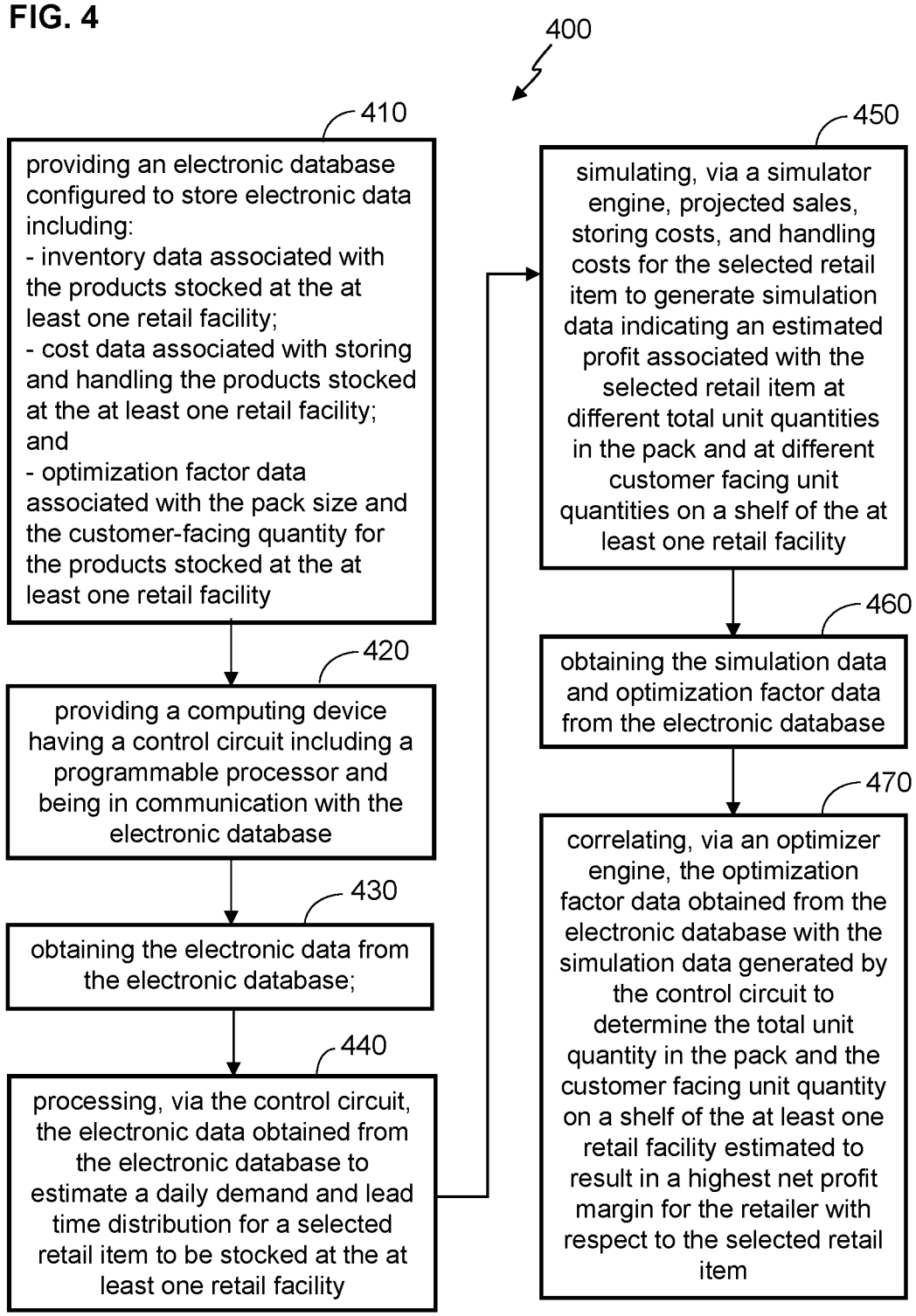

SYSTEMS AND METHODS OF OPTIMIZING PACK SIZE AND CUSTOMER-FACING QUANTITY OF RETAIL PRODUCTS AT RETAIL FACILITIES

TECHNICAL FIELD

This invention relates generally to inventory control at retail facilities, and more specifically, to controlling pack size and quantity of retail products at the retail facilities.

BACKGROUND

For large retailers operating thousands of stores and distribution centers, efficient inventory organization is essential for profit maximization. Inventory packing plays a large part in day-to-day operations of a large retailer and is directly related to both handling and transportation costs and levels of product sales. For example, for many large retailers, determining the optimal pack size (i.e., a number of units of a given retail product in a pack) and customer-facing quantity (i.e., a number of units of the retail product exposed to customers/workers on a shelf in a retail store/product distribution facility horizontally) for every product stocked at distribution centers and retail stores of a large retailer would lead to reduced operation costs and higher sales. However, determining the optimal pack size and customer-facing quantity for every one of the millions of retail products stocked at distribution centers and retail stores of a large retailer is a very complex, labor-intensive, costly task.

BRIEF DESCRIPTION OF THE DRAWINGS

Disclosed herein are embodiments of systems and methods pertaining to optimization of pack size and customer-facing quantity of retail products at retail facilities. This description includes drawings, wherein:

FIG. 4 is a flow chart diagram of a process of optimization of pack size and customer-facing quantity of retail products at retail facilities in accordance with some embodiments.

Figure 1:
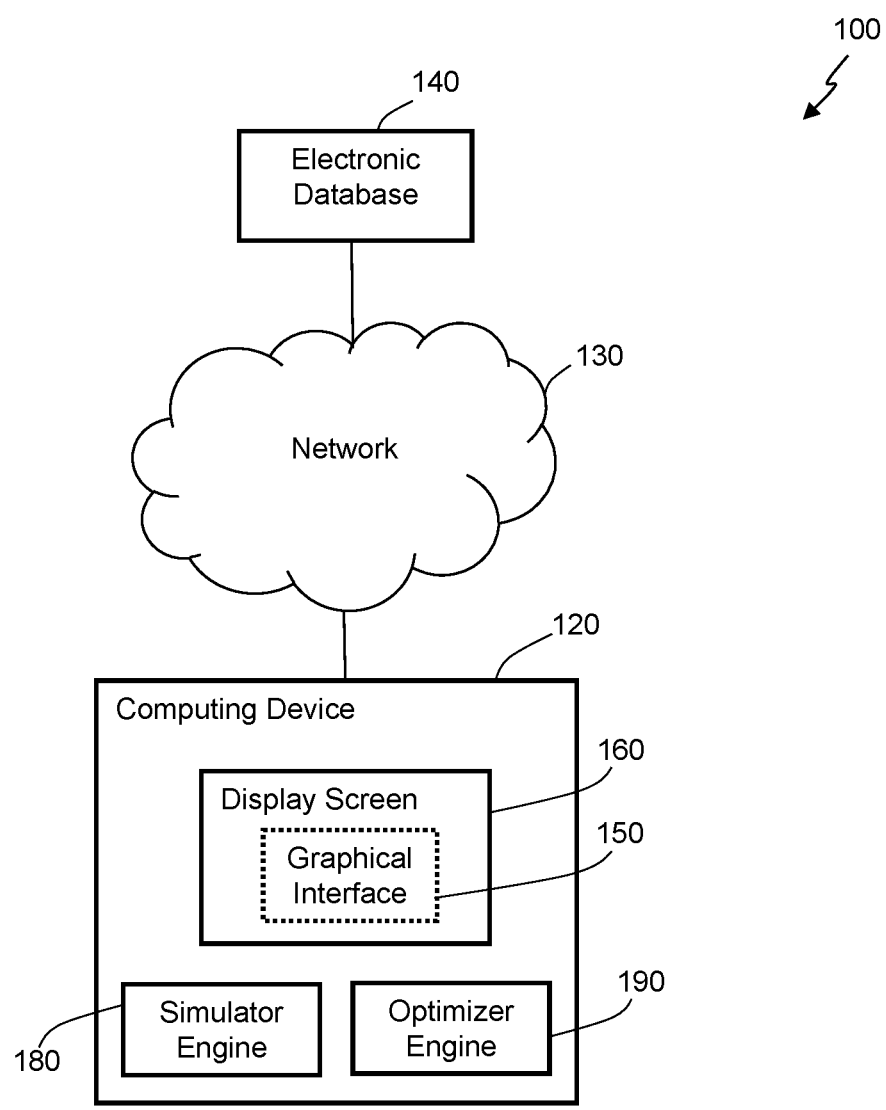
FIG. 1 is a diagram of a system for optimization of pack size and customer-facing quantity of retail products at retail facilities in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, the methods and systems described herein relate to estimating an optimal product pack size and on-shelf customer facing quantity of the products in view of shelf capacity limitations of the shelves at a given retail store/product distribution center, with the aim of maximizing the total net profit of the store/distribution center. The systems and methods obtain inventory-related, retail facility product storage capacity-related, and product storage/handling-related data from one or more databases and estimate the net profit of multiple variations of pack size and customer-facing quantity for each product. Then, these results are processed via various inventory optimization algorithms obtained from one or more databases to estimate the pack size and customer-facing quantity for each of the products to be stocked at the retail facility that would be estimated to result in maximum net profit for the retail facility within a given period of time.

In some embodiments, a computer-implemented system of optimization of pack size and customer-facing quantity of retail products for at least one retail facility includes an electronic database configured to store electronic data including: inventory data associated with the products stocked at the at least one retail facility; cost data associated with storing and handling the products stocked at the at least one retail facility; and optimization factor data associated with the pack size and the customer-facing quantity for the products stocked at the at least one retail facility. The system further includes a computing device having a control circuit including a programmable processor and being in communication with the electronic database. The computing device is configured to: obtain the electronic data from the electronic database; process, via the control circuit, the electronic data obtained from the electronic database to estimate a daily demand and a lead time distribution for a selected retail item to be stocked at the at least one retail facility in a pack; simulate, via a simulator engine, projected sales, storing costs, and handling costs for the selected retail item to generate simulation data indicating an estimated profit associated with the selected retail item at different total unit quantities in the pack and at different customer facing unit quantities on a product display surface of the at least one retail facility; obtain the simulation data and the optimization factor data from the electronic database; and correlate, via an optimizer engine, the optimization factor data obtained from the electronic database with the simulation data to determine the total unit quantity in the pack and the customer facing unit quantity on the product display surface of the at least one retail facility estimated to result in a highest net profit margin for the retailer with respect to the selected retail item.

In some embodiments, a computer-implemented method of optimization of pack size and customer-facing quantity of retail products for at least one retail facility includes providing an electronic database configured to store electronic data including: inventory data associated with the products stocked at the at least one retail facility; cost data associated with storing and handling the products stocked at the at least one retail facility; and optimization factor data associated with the pack size and the customer-facing quantity for the products stocked at the at least one retail facility. The method further includes providing a computing device having a control circuit including a programmable processor and being in communication with the electronic database. The method further includes, by the computing device: obtaining the electronic data from the electronic database; processing, via the control circuit, the electronic data obtained from the electronic database to estimate a daily demand and a lead time distribution for a selected retail item to be stocked at the at least one retail facility; simulating, via a simulator engine, projected sales, storing costs, and handling costs for the selected retail item to generate simulation data indicating an estimated profit associated with the selected retail item at different total unit quantities in the pack and at different customer facing unit quantities on a product display surface of the at least one retail facility; obtaining the simulation data and the optimization factor data from the electronic database; and correlating, via an optimizer engine, the optimization factor data obtained from the electronic database with the simulation data to determine the total unit quantity in the pack and the customer facing unit quantity on the product display surface of the at least one retail facility estimated to result in a highest net profit margin for the retailer with respect to the selected retail item.

FIG. 1 illustrates one embodiment of a system 100 for optimization of pack size and customer-facing quantity of retail products to facilitate profit maximization of at least one retail facility of a retailer. A retailer will be understood to mean any entity operating as a brick-and-mortar physical store and/or product distribution center and/or an internet-accessible website, which during the course of doing business, stocks, sells, and/or delivers products to customers (which may be individuals or business of any size). The retail facility may be any place of business operated by the retailer or (by a 3$^{rd}$ party) for a retailer, for example, a store, product storage warehouse, product distribution center, and the like, where consumer products are stocked, sold, and shipped from/to. The term "product display surface" may generally refer to any surface on which a product may be stocked/displayed at a retail facility, including but not limited to one or more shelves, table surfaces, refrigerator/freezer compartments, hang bars, etc.

The exemplary system 100 includes a computing device 120 configured to manage product inventory at one or more retail facilities operated by a retailer. The computing device 120 illustrated in FIG. 1 may be a stationary, portable, or hand-held electronic device (or a combination of one or more such electronic devices), for example, a desktop computer, a laptop computer, a server, a series of interconnected servers, a cloud-based service, a tablet, a mobile phone, or any other device that may be configured for data entry and communication with another device located at a facility operated by or for the retailer (e.g., retail store, a distribution center, a warehouse, a regional or central center configured for two-way communication with multiple retail facilities, etc.). As will be discussed in more detail below, while the computing device 120 has been illustrated as one physical device including a simulator module/engine 180 and an optimizer module/engine 190, it will be appreciated that the simulator module/engine 180 and/or the optimizer module/engine 190 may be stored on/operated from computing devices/servers/web services remote to the computing device 120.

In the embodiment illustrated in FIG. 1, the computing device 120 is configured to communicate with various electronic devices (e.g., electronic database 140, one or more portable electronic devices workers at a retail facility, etc.) via a network 130. The exemplary network 130 depicted in FIG. 1 may be a wide-area network (WAN), a local area network (LAN), a personal area network (PAN), a wireless local area network (WLAN), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage.

The exemplary system 100 depicted in FIG. 1 includes an electronic database 140. The electronic database 140 may be stored, for example, on non-volatile storage media (e.g., a hard drive, flash drive, or removable optical disk) internal or external relative to the computing device 120 or internal to computing devices (e.g., one or more remote web servers) separate and distinct from the computing device 120. In some embodiments, the electronic database 140 is cloud-based and stored on a cloud service platform. While the electronic database 140 is shown in FIG. 1 as a single database, it will be appreciated that the electronic database 140 can be implemented as a plurality of separate and distinct databases that are communicatively interconnected.

In some embodiments, the electronic database 140 stores electronic data including, but not limited to, at least one of the following data sets: historical data reflecting past sales of the retail products at one or more retail facilities; inventory data associated with the products stocked at one or more retail facilities; worker task data associated with the products stocked at one or more retail facilities; cost data associated with storing (e.g., on shelves at a warehouse, distribution center, store, etc.) and handling (e.g., packing, unpacking, transporting, etc.) the products stocked at one or more retail facilities; optimization factor data associated with the pack size and the customer-facing quantity for the products stocked at one or more retail facilities; and/or historical data reflecting past purchases of the retail products by the retailer from one or more vendors for the one or more retail facility. In some aspects, the inventory data stored in the electronic database 140 includes storage capacity data indicating a shelf capacity of one or more facilities of the retailer (e.g., a number of products that may be stored on one or more shelves and/or in one or more product display/storage areas of a retail facility).

In certain embodiments, the optimization factor data associated with the pack size and the on-shelf customer-facing quantity for the products stocked at a retail facility includes at least one optimization factor (the utilization of which by the computing device 120 will be discussed in more detail below). The optimization factor data stored in the electronic database 140 may include, but is not limited to, at least one of the following data sets, indicating: capacity limitations of each retail facility of the retailer; cost of goods to the retailer associated with the products stocked at each retail facility of the retailer; transportation costs associated with the products stocked at each retail facility of the retailer; labor and inventory costs associated with handling and transporting the products stocked at each retail facility of the retailer; inbound lead time (e.g., time from ordering/placing a replenishment request to receiving the product) associated with the products stocked at each retail facility of the retailer; outbound lead time associated with the products stocked at each retail facility of the retailer (e.g., time from receiving an order/replenishment request to delivering the product); and estimated demand level associated with the products stocked at each retail facility of the retailer.

In some aspects, the inventory data stored in the electronic database 140 includes business data indicating a dollar amount indicative of a current net profit associated with each of the retail products stocked at and/or offered for sale by a retail facility (e.g., distribution center, retail store, etc.). In certain aspects, the current net profit amount associated with a selected retail product is estimated by the computing device 120, as will be discussed in more detail below. In certain aspects, the worker task data stored in the electronic database 140 further includes break pack data reflecting a cost to the retailer of having a worker of the retail facility break open a given pack of products stocked at/sold by the retail facility and having the worker of the retail facility carry or transport the products removed from an opened pack to a shelf to be displayed at the retail facility and/or to a product loading area for loading onto a delivery truck. In certain embodiments, the cost to the retailer of having a worker break open and/or handle a pack of products stocked at/sold by the retail facility is estimated by the computing device 120, as will be discussed in more detail below.

As used herein, the term "pack size" may refer to a vendor pack size representing the total number of units of a given product in a pack to be received by a product distribution center of the retailer. Likewise, the term "pack size" may refer to a warehouse pack size representing the total number of units of a given product in a pack to be received by the retail store of the retailer from the product distribution center of the retailer. In some aspects, the inventory data stored in the electronic database 140 includes inbound and outbound level data representing a total number of units of a given product delivered from one or more vendors to the distribution center of the retailer within a given period of time. In some aspects, the inventory data stored in the electronic database 140 includes inbound and outbound level data representing a total number of units of the selected product delivered from a distribution center of the retailer to a retail store of the retailer.

Figure 2:
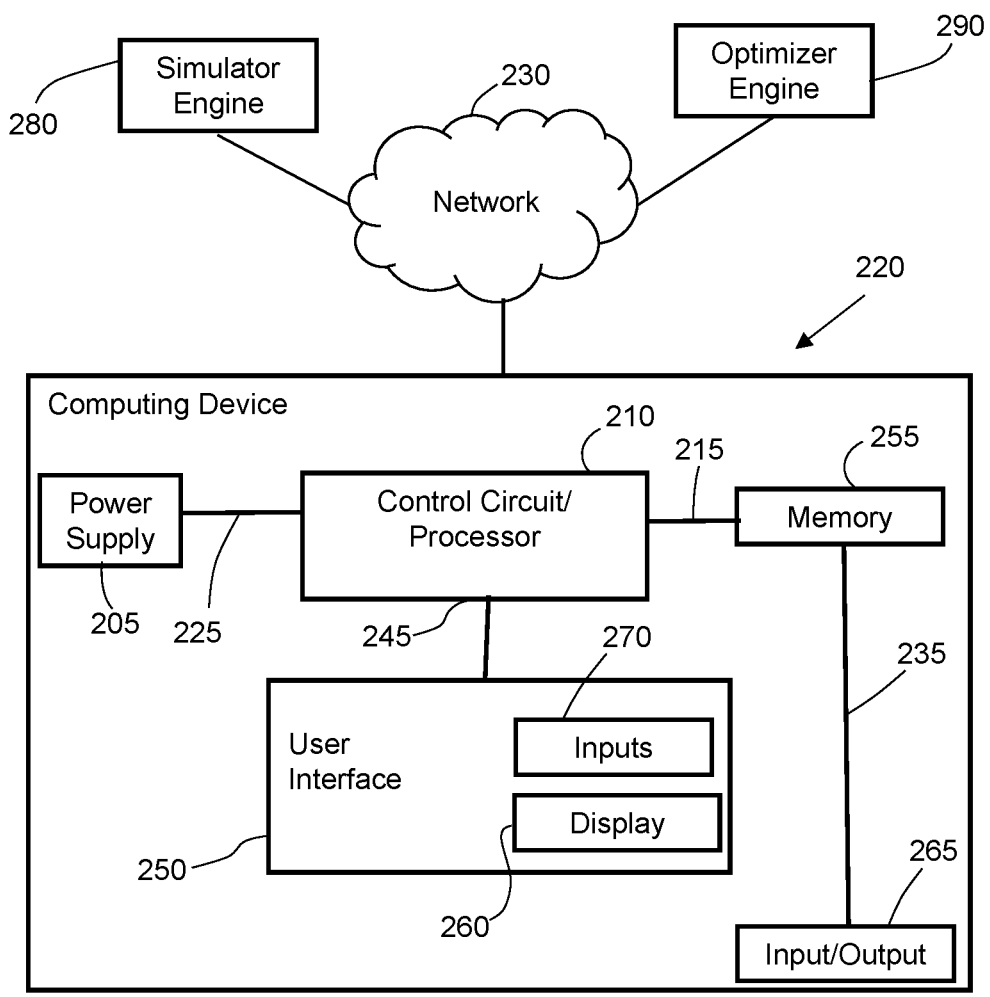
FIG. 2 is a functional diagram of an exemplary computing device configured for optimization of pack size and customer-facing quantity of retail products at retail facilities in accordance with several embodiments.

With reference to FIG. 2, an exemplary computing device 220 configured for use with exemplary systems and methods described herein may include a control unit or control circuit 210 including a processor (for example, a microprocessor or a microcontroller) electrically coupled via a connection 215 to a memory 255 and via a connection 225 to a power supply 205. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control circuit 210 can be configured (for example, by using corresponding programming stored in the memory 255 as will be well understood by those skilled in the art) to carry out one or more of the steps, actions, and/or functions described herein. In some embodiments, the memory 255 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control circuit may be referred to as a non-transitory medium or non-transitory computer readable medium.

The control circuit 210 of the computing device 220 is also electrically coupled via a connection 235 to an input/output 265 that can receive signals from the computing device 220, or from any other source that can communicate with the computing device 220 via the network 130. The input/output 265 of the computing device 220 can also send signals to the electronic database 140 and/or to any other device in wired or wireless communication with the computing device 220 over the network 130 or any other communication channel.

In the embodiment shown in FIG. 2, the processor-based control circuit 210 of the computing device 220 is electrically coupled via a connection 245 to a user interface 250, which may include a visual display or display screen 260 (e.g., light-emitting-diode (LED) screen) and/or button input 270 that provide the user interface 250 with the ability to permit an operator of the computing device 220 to manually control the computing device 220 by inputting commands via touch-screen and/or button operation and/or voice commands. It will be appreciated that the performance of such functions by the processor-based control circuit 210 of the computing device 220 is not dependent on a human operator, and that the control circuit 210 may be programmed to perform such functions without a human operator.

In some embodiments, the display screen 260 of the computing device 220 is configured to display various graphical interface-based menus, options, and/or alerts that may be transmitted from and/or displayed on the computing device 220 in connection with various aspects of optimizing the pack size and on-shelf customer-facing quantity of retail products at a retail facility for profit maximization of the retail facility. The inputs 270 of the computing device 220 may be configured to permit an operator to navigate through the on-screen menus on the computing device 220 and make changes and/or updates to the product pack size and/or customer-facing quantity of one or more products stocked at a retail facility determined by the control circuit 210. It will be appreciated that the display screen 260 may be configured as both a display screen and an input 270 (e.g., a touchscreen that permits an operator to press on the display screen 260 to enter text and/or execute commands.)

In some embodiments, the control circuit 210 of the computing device 220 is programmed to estimate a pack size and a product facing quantity for each of the products stocked at a distribution center/retail store of a retailer in order to facilitate maximum profit optimization for the distribution center/retail store. In one aspect, the control circuit 210 of the computing device 220 is programmed to obtain electronic data from the electronic database 140 over the network 130.

The electronic data that may be obtained by the computing device 120 from the electronic database 140 in the course of an estimation of optimal pack size and product-facing quantity of a given product stocked/sold by a retailer may include, but is not limited to at least one of: historical data reflecting past sales (and returns) of the product at one or more retail facilities of the retailer; inventory data (e.g., on-hand quantity, in-transit quantity, etc.) associated with the product at one or more retail facilities of the retailer; worker task data (e.g., worker tasks in-progress, worker tasks in queue, etc.) associated with the product at one or more retail facilities of the retailer; cost data (e.g., dollar amounts) associated with storing and handling the product at one or more retail facilities of the retailer; optimization factor data associated with the pack size and the customer-facing quantity for the products stocked at the at least one retail facility; historical data reflecting past purchases of this product by the retailer from one or more vendors for the at least one retail facility; business data indicating a dollar amount indicative of a current net profit for the retailer generated by this product; break pack data reflecting a cost to the retailer of having a worker of the retail facility open the pack containing this product having the worker of the retail facility transport the product retrieved from an opened pack to a shelf to be displayed at the retail facility; storage capacity data indicating a shelf capacity of the retail facility; and/or inbound and outbound level data representing a total number of units of the product delivered from vendors to the distribution center of the retailer within a selected period of time and a total number of units of the product delivered from the distribution center of the retailer to the retail store of the retailer.

In one aspect, after the control circuit 210 of the computing device 120 causes the computing device 120 to obtain (e.g., via the network 130) one or more of the above-discussed data sets from the electronic database 140, the control circuit 210 of the computing device 120 is programmed to correlate one or more of the data sets obtained from the electronic database 140 to estimate a daily demand and a lead time distribution for a selected retail product that will be stocked and/or sold at a retail facility of the retailer in a pack. The estimated daily demand for the product of interest may include an indication of an estimated total number of units of the product estimated based on the analyzed data sets by the control circuit 210 to be demanded (i.e., desired to be purchased) by customers (e.g., individual consumers that buy products from the retailer, retail stores that order products from a distribution center of the retailer, etc.) on each day of a week for which the daily demand is being estimated/forecasted.

The estimated daily lead time for a product may include an indication of an estimated total number of hours from the time a distribution center of the retailer orders the product from a vendor to a time when the product is received by the distribution center from the vendor. The estimated daily lead time for a product may also include an indication of an estimated total number of hours from the time a retail store submits a replenishment request to a distribution center of the retailer to a time when the product is received by the retail store from the distribution center.

In some embodiments, the computing device 120 is configured to execute/run a simulation of projected sales, storing costs, and handling costs for a selected retail item when packed at various pack sizes and oriented in various customer-facing quantities in order to generate simulation data indicating an estimated profit associated with the selected retail item at the simulated different total unit quantities in the pack and at the simulated different customer facing unit quantities on the shelf of a retail facility. In some embodiments, the control circuit 210 is programmed to execute a simulation of the projected sales, storing costs, and handling costs for the selected retail item based on a Monte Carlo simulation model.

Figure 3:
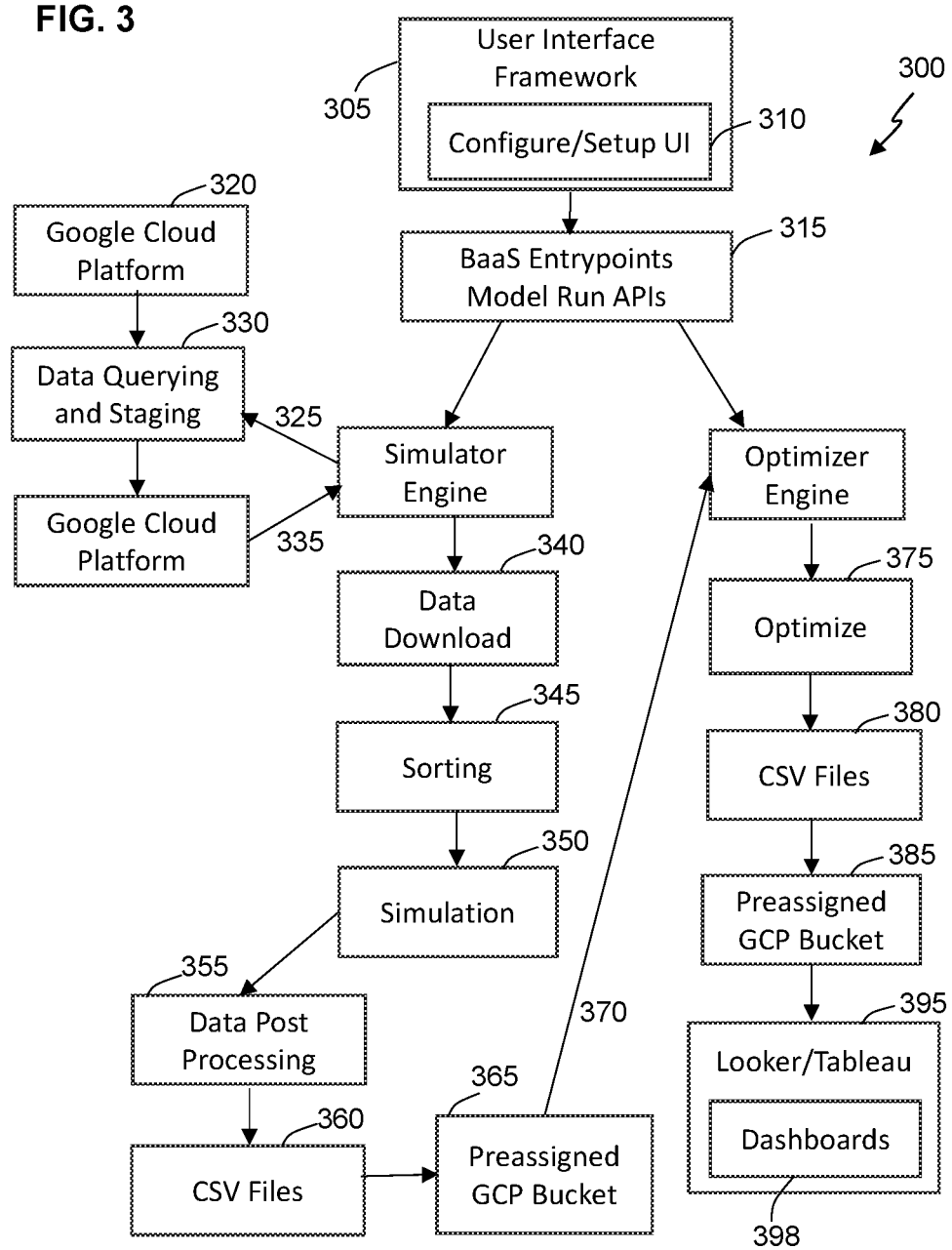
FIG. 3 is a flow chart diagram of a process of simulation and optimization of pack size and customer-facing quantity of retail products at retail facilities in accordance with several embodiments.

A logic flow 300 depicting exemplary operations of the simulator engine 180 and the optimizer engine 190 is illustrated in FIG. 3. As mentioned above, the computing device 120 is configured for displaying and setting up a configurable graphical interface 150. With reference to FIG. 3, the logic flow 300 includes using a suitable user interface (UI) framework (step 305) to configure/set up a user interface (step 310) usable with the embodiments of the methods/systems described herein. In addition, the exemplary logic flow 300 includes setting up/configuring backend as a service (BaaS) platform entrypoints and/or model run application programming interfaces (APIs) (step 315) to facilitate linking the computing device 120 (e.g., via the graphical user interface 150) to backend cloud storage and/or one or more application programming interfaces, where the simulator engine 180 and/or the optimizer engine 190 may be hosted/stored.

In the exemplary implementation shown in FIG. 1, the computing device 120 includes a simulator engine 180 executable by the control circuit 210 of the computing device 120 to run the above-described simulation. In the exemplary implementation shown in FIG. 2, the simulator engine 280 is not stored on the computing device 220, but is stored on one or more computers, web servers, or cloud platforms configured for communication over the network 230 with the computing device 120. In some embodiments, instead of being incorporated into/installed on the computing device 120, the simulator engine 180 may be web-based, for example, stored on and operated from a cloud platform (e.g., Google Cloud).

In certain implementations, the simulator engine 180 is a cloud-based service accessible via a user interface and configured via a backend as a service (BaaS) platform, using one or more BaaS entrypoints to link to backend cloud storage and/or one or more application programming interfaces. In one embodiment, the simulator engine 180 is a web/cloud-based engine/service implemented via one or more graphics processing unit-enabled virtual machines (GPUVM1, GPUVM2, etc.) via a Docker® platform and/or a Kubernetes platform and/or a Walmart Cloud Native Platform (WCNP).

In some embodiments, the simulator engine 180 is programmed to query the electronic database 140 and obtain (i.e., download) and sort one or more data sets from the electronic database 140. For example, the simulator engine 180 may be programmed to query the electronic database 140 to obtain one or more data sets including, but not limited to data representing at least one of: historical data reflecting past sales of the retail products at one or more retail facilities; inventory data associated with the products stocked at one or more retail facilities; worker task data associated with the products stocked at one or more retail facilities; cost data associated with storing and handling the products stocked at one or more retail facilities; and optimization factor data associated with the pack size and the customer-facing quantity for the products stocked at one or more retail facilities; historical data reflecting past purchases of the retail products by the retailer from one or more vendors for the one or more retail facility; and/or storage capacity data indicating a shelf capacity (e.g., a number of products that may be stored on one or more shelves and/or in one or more product display/storage areas) of one or more facilities of the retailer.

As pointed out above, while the electronic database 140 is shown in FIG. 1 as a single database, the electronic database 140 can be implemented as a plurality of separate and distinct databases that are communicatively interconnected, and may be stored on a cloud-based service platform. With reference to FIG. 3, in one implementation, the electronic database 140 includes a cloud-based data storage platform (e.g., Google Cloud Platform (GCP) utilizing Data Lake data storage), and the exemplary logic flow 300 includes storing data on a Google Cloud Platform (step 320), transmitting a data query to the Google Cloud Platform by the simulator engine (step 325), followed by data querying and staging (step 330), and transmitting the data responsive to the simulator engine query from the Google Cloud Platform to the simulator engine 180 (step 335).

In the embodiment shown in FIG. 3, the exemplary logic flow 300 further includes the simulator engine downloading the data that is transmitted to the simulator engine 180 from the Google Cloud Platform (step 340), then sorting the data downloaded by the simulator engine 180 from the Google Cloud Platform (step 345). In certain aspects, the simulator engine 180 is programmed to run simulations of estimated profit for the retailer associated with the selected retail item when packed at different total unit quantities in the pack and at different horizontal facing unit quantities on a shelf at a retail facility to generate simulation data based on these simulations (step 350).

Generally, the simulator engine 180 is programmed to simulate the retail facility profit estimations associated with various pack sizes and facing quantities by analyzing multiple levels/nodes of the supply chain network of the retailer, namely, vendors, distribution centers and retail stores. In some embodiments, the simulator engine 180 may be programmed to evaluate various certain and uncertain factors including but not limited to, for example: on-hand product inventory at each retail facility of the retailer; capacity limitations of each retail facility (e.g., distribution center and retail store) of the retailer; cost of goods to the retailer associated with the products stocked at each retail facility of the retailer; transportation costs associated with the products stocked at each retail facility of the retailer; labor and inventory costs associated with transporting and handling the products stocked at each retail facility of the retailer; order processing and fulfillment costs associated with the product stocked at each retail facility; inbound lead time associated with the products (i.e., transportation time from vendor to DC); outbound lead time associated with the products (i.e., transportation time from the distribution center to the retail store); and estimated demand level associated with the products at each retail facility of the retailer. In other words, the simulator engine 180 is programmed to run a simulation of net profit to the retail store resulting in from varying product pack sizes and facing quantities that considers all of the supply chain nodes (including retail store operations) while taking into consideration the stochastic features of the supply chain network and to-to-bottom cost types to the retailer.

In some embodiments, the simulator engine 180 is programmed to simulate the net profits associated with both vendor pack sizes (i.e., total number of units of a given product in a pack to be received by a product distribution center of the retailer) and warehouse pack sizes (i.e., total number of units of a given product in a pack to be received by the retail store of the retailer from the product distribution center of the retailer). In certain embodiments, the simulator engine 180 is programmed to factor in whether the packaging for a given product is conveyable or not conveyable (i.e., a pack (of usually smaller-size items) that meets the size, weight, and handling requirements for transporting the pack on a conveyor and/or in a delivery truck) or not conveyable (i.e., a pack (of usually large-size items) that would exceed the size, weight, and handling requirements for transporting the pack on a conveyor and/or in a delivery truck). In some embodiments, the simulator engine 180 is programmed to factor in the costs of transporting and handling a product in casepack (i.e., while multiple units of a given product are handled/transported while being packed together in a case), and in breakpack (i.e., while the units of a given product are handled/transported individually instead of as a pack). Generally, a break pack product is referred to any product with a vendor pack quantity that is larger than the warehouse pack quantity.

The logic flow 300 includes the simulator engine 180 processing the simulation data (step 355) to generate data in various data formats, one of the exemplary data formats generated by the simulator engine 180 during data post processing being comma-separated value (CSV) files (step 360). In some embodiments, after the simulator engine 180 runs (e.g., is executed by the control circuit 210 of the computing device 120 to run) the aforementioned pack size and horizontal facing quantity simulations, the simulator engine 180 is programmed to transmit the generated simulation data to the electronic database 140 for storage. In the exemplary logic flow 300 illustrated in FIG. 3, the simulator engine 180 is configured to cause the data files representing the simulation data generated by the simulator engine 180 to be stored in Google Cloud Platform (GCP) data storage resource commonly known as "buckets" (step 365).

As mentioned above, after the simulator engine 180 runs the aforementioned simulations to generate the simulation data and causes this simulation data to be stored in the electronic database 140 (e.g., in preassigned GCP Buckets as in step 365 of FIG. 3), in some aspects, the control circuit 210 of the computing device 120 is configured to cause the computing device 120 to obtain the simulation data generated by the simulator engine 180 as well as optimization factor data stored in the electronic database 140, and correlate the optimization factor data obtained from the electronic database 140 with the simulation data generated by the simulator engine 180 to optimize the pack size and product-facing quantity (i.e., the total unit quantity of the product in a pack and the customer-facing product unit quantity on a shelf estimated by the control circuit 210 to be associated with the highest net profit margin for the retailer) for a given product.

To that end, in the exemplary implementation shown in FIG. 1, the computing device 120 includes an optimizer engine 190 executable by the control circuit 210 of the computing device 120 (or via a web/cloud-based application service to run the pack size product unit quantity and horizontal facing product unit quantity optimization operation. In the exemplary implementation shown in FIG. 2, the optimizer engine 290 is not stored on the computing device 220, but is stored on one or more computers, web servers, or cloud platforms configured for communication over the network 230 with the computing device 120.

With reference to FIG. 3, in the exemplary logic flow 300, the optimizer engine 190 obtains (i.e., downloads) from the electronic database 140 (e.g., from the Google Cloud Platform data storage Buckets) the simulation data generated by the simulator engine 180 (step 370). In certain implementations, step 370 also includes the optimizer engine 190 obtaining from the electronic database 140 (e.g., from the Google Cloud Platform data storage Buckets) one or more data sets representing one or more net profit optimization factors including, but not limited to, data representing at least one of: capacity limitations of each retail facility of the retailer; cost of goods to the retailer associated with the products stocked at each retail facility of the retailer; transportation costs associated with the products stocked at each retail facility of the retailer; labor and inventory costs associated with the products stocked at each retail facility of the retailer; inbound lead time associated with the products stocked at each retail facility of the retailer; outbound lead time associated with the products stocked at each retail facility of the retailer; and/or estimated demand level associated with the products stocked at each retail facility of the retailer.

After the optimizer engine 190 obtains the aforementioned data sets in step 370, the exemplary logic flow 300 further includes the optimizer engine 190 optimizing the obtained data (step 375). In certain implementations, the optimizer engine 190 is executable by the control circuit 210 of the computing device 120 to correlate the optimization factor data obtained from the electronic database 140 with the simulation data generated (via the control circuit 210) by the simulator engine 180 in order to estimate the optimal pack size and product-facing quantity for a given product, i.e., the total unit quantity of the product in the pack and the total customer facing unit quantity on a shelf of a retail facility estimated by the optimizer engine 190 to result in the highest net profit margin for the retail facility of the retailer with respect to the selected retail item.

Some exemplary logic operations performed by the computing device 120 during the overcall course of the above-discussed logic flow 300 are reproduced below.

Step 1—Warehouse Pack Logic: (1) Constrained by Shelf Space: (a) if 1 unit is greater than or equal to 15 pounds or greater than or equal to 1 cubic foot, then make warehouse pack of 1, so that the retail store does not receive large/heavy packs that exceed 30 pounds and/or 2 cubic feet; and (b) Optimal (bounded by shelf): least of: 1.5× warehouse pack and less than 95% shelf (1.5 pack or 2.0 pack depending on the scenario), warehouse pack less than or equal to 30 pounds and less than or equal to 2 cubic feet (store ergonomics), Walton Value (maximum units based on unit cost and unit DOS (directly operated store)), and 90 days of store supply; (2) Optimal (Not Constrained by Shelf Space): (a) if 1 unit is greater than or equal to 15 pounds or greater than or equal to 1 cubic foot, then make warehouse pack of 1; (b) Optimal: least of: 1.5× warehouse pack and less than or equal to 30 pounds and two cubic feet (store ergonomics), Walton Value (maximum units based on unit cost and unit DOS (directly operated store)), 90 days of store supply.

Step 2—Pack Type Logic (same for optimal and shelf constrained): (1) warehouse pack is conveyable=casepack; (2) network/channel is Grocery/Frozen-Dairy (FDD)//FDDDirect Store Delivery Consolidation (DSDC)/Direct Store Delivery (DSD)=casepack; (3) any item dimension is greater than or equal to 21 inches and item cost is less than or equal to $50=casepack; (4) all other items=breakpack.

Step 3—Vendor Pack Logic (same for optimal and shelf constrained): (1) pack type is casepack (calculated in Step 2): vendor pack=warehouse pack; (2) pack type is breakpack (calculated in Step 2): lease of: (1) maximum units that fit a breakpack slot (front-end distribution center (FDC)=20 inches by 15 inches by 20 inches; regional distribution center (RDC)=14 inches by 8 inches by 10 inches; (2) greater of 7 distribution center days of supply or minimum conveyable quantity; (c) 20 picks (40 picks for FDC); (d) 30 pounds (40 pounds for FDC).

In certain implementations, the optimizer engine 190 is programmed to run the optimizer operations and generate optimization data based on these operations, and process the generated optimization data into various data formats, with one exemplary data formats being comma-separated value (CSV) file. In some embodiments, after running the optimization operation, the optimizer engine 190 is programmed to process the optimization data to generate data storing CSV files (step 380). As pointed out above, CSV files are just one type of data storage files that may be generated by the optimizer engine 190, and the optimizer engine 190 may be configured to generate various other suitable data storing file formats.

In the embodiment of FIG. 3, after the optimizer engine 190 runs (e.g., is executed by the control circuit 210 of the computing device 120 to run) the aforementioned pack size and horizontal facing quantity optimization operations, the optimizer engine 190 is programmed to transmit the generated simulation data to the electronic database 140 for storage. In the exemplary logic flow 300 illustrated in FIG. 3, the optimizer engine 190 is configured to cause the (CSV) data files representing the pack size and horizontal facing quantity optimization data generated by the optimizer engine 190 to be stored in Google Cloud Platform data buckets (step 385).

With reference to FIG. 3, after the (CSV) data files representing the product pack size and horizontal product facing quantity optimization data generated by the optimizer engine 190 is stored in Google Cloud Platform data buckets, the logic flow 300 further includes associating the optimization data generated by the optimizer engine 190 with a data indexing/visualization platform (step 395). In the illustrated embodiment, the data indexing/visualization platform may include a dashboard 398 based on the Looker, Tableau, or the like platforms, which facilitate dashboard user interface-based optimization data retrieval and analytics, thereby increasing the usefulness of the optimization data to large organizations such as regional/global retailers. In some embodiments, the inventory data stored in the electronic database 140 includes business data indicating a dollar amount indicative of a current net profit associated with a selected retail item, maximum estimated net profit margin for the retailer with respect to the selected retail item estimated by the computing device 120 during the simulation/optimization process described above, and a percentage net profit increase of the maximum estimated net profit margin for the retailer with respect to the selected retail item estimated by the computing device 120 during the simulation/optimization process, and this data may be presented to a user of the computing device 120 via one or more dashboards 398 in a table format, or another suitable format.

In some embodiments, instead of being incorporated into/installed on the computing device 120, the optimizer engine 190 may be web-based, for example, stored on and operated from a cloud platform (e.g., Google cloud). In certain implementations, the optimizer engine 190 is a cloud-based service accessible via a user interface and configured via a backend as a service (BaaS) platform, using one or more BaaS entrypoints to link to backend cloud storage and/or one or more application programming interfaces. In one embodiment, the optimizer engine 190 is a web/cloud-based engine/service implemented via one or more graphics processing unit-enabled virtual machines (GPUVM1, GPUVM2, etc.) via a Docker® platform and/or a Kubernetes platform and/or a Walmart Cloud Native Platform (WCNP).

With reference to FIG. 4, one exemplary method 400 of operation of the system 100 to optimize the product pack size and customer-facing product quantity of retail products for at least one retail facility is shown. For exemplary purposes, the method is described in the context of the system of FIG. 1, but it is understood that embodiments of the method may be implemented in this or other systems.

As shown in FIG. 4, the method 400 includes providing an electronic database 140 configured to store electronic data including: inventory data associated with the products stocked at the at least one retail facility; cost data associated with storing and handling the products stocked at the at least one retail facility; and optimization factor data associated with the pack size and the customer-facing quantity for the products stocked at the at least one retail facility (step 410). In some embodiments, the electronic database 140 is further configured to store at least one of: historical data reflecting past purchases of the retail products by the retailer from one or more vendors for the at least one retail facility; worker task data associated with the products stocked at the at least one retail facility, the worker task data according to some implementations including break pack data reflecting a cost to the retailer of having a worker of the retail facility open the pack containing the selected retail item and having the worker of the retail facility transport the selected retail item from an opened pack to a shelf at the retail facility; historical data reflecting past sales of the retail products at the at least one retail facility; storage capacity data indicating a shelf capacity of the at least one retail facility; inbound and outbound level data representing a total number of units of the selected product delivered from vendors to the distribution center of the retailer within a selected period of time and a total number of units of the selected product delivered from the distribution center of the retailer to the retail store of the retailer; and/or business data indicating a dollar amount indicative of a current net profit associated with the selected retail item, the highest estimated net profit margin for the retailer determined by the control circuit with respect to the selected retail item, and a percentage net profit increase of the highest estimated net profit margin for the retailer determined by the control circuit with respect to the selected retail item in comparison to the current net profit associated with the selected retail item.

With reference to FIG. 4, the exemplary method 400 includes providing a computing device 120 having a control circuit 210 including a programmable processor and being in communication with the electronic database 140 (step 420). The method 400 further includes the computing device 120 obtaining the electronic data from the electronic database 140 (step 430). As mentioned above, the electronic database 140 may be a single database as shown in FIG. 1, or may be implemented as a plurality of separate and distinct databases that are communicatively interconnected, and may be stored on a cloud-based service platform (e.g., Google Cloud Platform utilizing Data Lake, and/or GCP Buckets data storage).

In the embodiment illustrated in FIG. 4, after the computing device 120 obtains data from the electronic database 140, the control circuit 210 of the computing device 120 is programmed to run simulations of estimated profit for the retailer associated with the selected retail item when packed at different total unit quantities in the pack and at different horizontal facing unit quantities on a shelf at a retail facility to generate simulation data based on these simulations. To that end, the exemplary method 400 further includes processing, via the control circuit 210, the electronic data obtained from the electronic database 140 to estimate a daily demand and lead time distribution for a selected pack-associated retail item to be stocked at the at least one retail facility (step 440). Additionally, the method 400 further includes simulating, via a simulator engine 180, projected sales, storing costs, and handling costs for the selected retail item to generate simulation data indicating an estimated profit associated with the selected retail item at different total unit quantities in the pack and at different customer facing unit quantities on a shelf of the at least one retail facility (step 450).

As discussed above, after the simulator engine 180 runs (e.g., is executed by the control circuit 210 of the computing device 120 to run) the pack size and horizontal facing quantity simulations, the simulator engine 180 is programmed to transmit the generated simulation data to the electronic database 140 for storage (e.g., in preassigned Google Cloud Platform buckets). After the simulator engine 180 runs the simulations to generate the simulation data and causes this simulation data to be stored in the electronic database 140, in some aspects, the control circuit 210 of the computing device 120 is configured to cause the computing device 120 to obtain the simulation data generated by the simulator engine 180 as well as optimization factor data stored in the electronic database 140. To that end, the exemplary method 400 includes obtaining the simulation data and optimization factor data from the electronic database 140 (step 460).

As mentioned above, the optimization factor data stored in the electronic database 140, which facilitates the optimization data processing by the optimizer engine 190, may include but not limited to, data representing at least one of: capacity limitations of each retail facility of the retailer; cost of goods to the retailer associated with the products stocked at each retail facility of the retailer; transportation costs associated with the products stocked at each retail facility of the retailer; labor and inventory costs associated with the products stocked at each retail facility of the retailer; inbound lead time associated with the products stocked at each retail facility of the retailer; outbound lead time associated with the products stocked at each retail facility of the retailer; and/or estimated demand level associated with the products stocked at each retail facility of the retailer.

After the simulation data and optimization factor data is obtained by the computing device 120 (e.g., by the optimizer engine 190 executable by the control circuit 210 of the computing device 120), the computing device 120 correlates this data to optimize the pack size of the product and the on-shelf product facing quantity of the product at a retail facility to facilitate profit maximization for the retail facility. To that end, the exemplary method 400 further includes correlating, via an optimizer engine 190, the optimization factor data obtained from the electronic database 140 with the simulation data to determine the total unit quantity in the pack and the customer facing unit quantity on a shelf of the at least one retail facility estimated to result in a highest net profit margin for the retailer with respect to the selected retail item (step 470).

In certain implementations, the optimizer engine 190 is programmed to run the optimizer operations and generate optimization data based on these operations, and process the generated optimization data into various data formats, with one exemplary data formats being comma-separated value (CSV) file. In some embodiments, after running the optimization operation, the optimizer engine 190 is programmed to process the optimization data to generate data storing CSV files, which may be stored in Google Cloud Platform data buckets. In addition, in some aspects, after the data files representing the product pack size and horizontal product facing quantity optimization data generated by the optimizer engine 190 is stored in Google Cloud Platform data buckets, this stored data may be associated with a data indexing/visualization platform (e.g., Looker, Tableau, etc.), which facilitates dashboard user interface-based optimization data retrieval and analytics, and increases the accessibility and usefulness of the optimization data to large organizations such as regional/global retailers.

The systems and methods described herein provide systems and methods configured to analyze data sources across multiple echelons and nodes of the product supply chain of a large retailer, estimate a daily demand and lead time distribution for a selected pack-associated retail item to be stocked at the at least one retail facility, simulate projected sales, storing costs, and handling costs for the selected retail item to generate simulation data indicating an estimated profit associated with the selected retail item at different total unit quantities in the pack and at different customer facing unit quantities on a shelf of the at least one retail facility, and process such data in view of optimization algorithms to determine the total unit quantity in the pack and the customer facing unit quantity on a shelf of the at least one retail facility estimated to result in a highest net profit margin for the retailer with respect to the selected retail item. As a result, the present invention is a dynamic, multi-level software- and hardware-implemented solution to inventory management, and more specifically, to product pack size considerations and customer-facing on-shelf product quantity considerations, which can greatly reduce the operation costs and greatly increase the profits for large retailers.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A computer-implemented system of optimization of pack size and customer-facing quantity of retail products for at least one retail facility, the system comprising:
    an electronic database configured to store electronic data including:
        inventory data associated with the products stocked at the at least one retail facility;
        cost data associated with storing and handling the products stocked at the at least one retail facility; and
        optimization factor data associated with the pack size and the customer-facing quantity for the products stocked at the at least one retail facility;
    a computing device including:
        a control circuit including a programmable processor and being in communication with the electronic database, the control circuit programmed to:
            obtain the electronic data from the electronic database; and
            cause the electronic data obtained from the electronic database to be processed to estimate a daily demand and a lead time distribution for a selected retail item to be stocked at the at least one retail facility in a pack;
        a simulator engine executable by the control circuit and programmed to:
            download and sort the electronic data transmitted to the simulator engine from the electronic database; and
            process the downloaded and sorted data to simulate projected sales, storing costs, and handling costs for the selected retail item to generate at least one simulation data file including electronic simulation data indicating an estimated profit associated with the selected retail item at different total unit quantities in the pack and at different customer facing unit quantities on a product display surface of the at least one retail facility;
        an optimizer engine executable by the control circuit and programmed to:
            obtain the at least one simulation data file including the electronic simulation data;
            obtain the optimization factor data from the electronic database; and
            correlate the optimization factor data obtained from the electronic database with the at least one simulation data file including the simulation data to generate at least one optimization data file including electronic optimization data representing the total unit quantity in the pack and the customer facing unit quantity on the product display surface of the at least one retail facility estimated to result in a highest net profit margin for the retailer with respect to the selected retail item; and
    wherein the control circuit is further configured to:
        process the at least one simulation data file and the at least one optimization data file to generate corresponding table format data storage files;
        cause the table format data storage files generated by the control circuit to be stored in the electronic database;
        associate the table format data storage files stored in the electronic database with a data indexing and visualization platform including a graphical user interface displayed to a user on a display screen of the computing device, wherein the graphical user interface is in a format of a dashboard including one or more interactive menus that, in response to an interaction by the user, cause the data indexing and visualization platform to:
            obtain the table format data storage files from the electronic database; and
            process and extract data from the table format data storage files obtained from the electronic database to generate within the graphical user interface, based on the data extracted from the table format data storage files, a table within the graphical user interface, wherein the table permits the user to retrieve, from the table, the total unit quantity in the pack and the customer facing unit quantity on the product display surface of the at least one retail facility estimated to result in a highest net profit margin for the retailer with respect to the selected retail item.

2. The system of claim 1, wherein the inventory data stored in the electronic database includes historical data reflecting past purchases of the retail products by the retailer from one or more vendors for the at least one retail facility.

3. The system of claim 1, wherein the inventory data stored in the electronic database includes business data indicating a dollar amount indicative of a current net profit associated with the selected retail item, the highest estimated net profit margin for the retailer determined by the control circuit with respect to the selected retail item, and a percentage net profit increase of the highest estimated net profit margin for the retailer determined by the control circuit with respect to the selected retail item in comparison to the current net profit associated with the selected retail item.

4. The system of claim 1,
wherein the data stored in the electronic database further includes worker task data associated with the products stocked at the at least one retail facility; and
wherein the worker task data includes break pack data reflecting a cost to the retailer of having a worker of the retail facility open the pack containing the selected retail item and having the worker of the retail facility transport the selected retail item from an opened pack to the product display surface at the retail facility.

5. The system of claim 1, wherein the electronic database is further configured to store:
historical data reflecting past sales of the retail products at the at least one retail facility; and
storage capacity data indicating a product display surface capacity of the at least one retail facility.

6. The system of claim 1, wherein the retail sales facility is at least one of a retail store of a retailer and a product distribution center of the retailer.

7. The system of claim 6, wherein the pack size includes at least one of:
a vendor pack size representing the total number of units of the selected product in a pack to be received by the product distribution center of the retailer;
a warehouse pack size representing the total number of units of the selected product in a pack to be received by the retail store of the retailer from the product distribution center of the retailer.

8. The system of claim 6, wherein the inventory data stored in the electronic database includes inbound and outbound level data representing a total number of units of the selected product delivered from vendors to the distribution center of the retailer within a selected period of time and a total number of units of the selected product delivered from the distribution center of the retailer to the retail store of the retailer.

9. The system of claim 1, wherein the optimization factor data associated with the pack size and the customer-facing quantity for the products stocked at the at least one retail facility includes at least one optimization factor, the at least one optimization factor including at least one of: capacity limitations of the at least one retail facility; cost of goods to the retailer associated with the products stocked at the at least one retail facility; transportation costs associated with the products stocked at the at least one retail facility; labor and inventory costs associated with the products stocked at the at least one retail facility; inbound lead time associated with the products stocked at the at least one retail facility; outbound lead time associated with the products stocked at the at least one retail facility; and estimated demand level associated with the products stocked at the at least one retail facility.

10. The system of claim 1, wherein the processor of the control circuit is programmed to simulate the projected sales, storing costs, and handling costs for the selected retail item to generate the simulation data based on a Monte Carlo simulation model.

11. A computer-implemented method of optimization of pack size and customer-facing quantity of retail products for at least one retail facility, the method comprising:
providing an electronic database configured to store electronic data including:
inventory data associated with the products stocked at the at least one retail facility;
cost data associated with storing and handling the products stocked at the at least one retail facility; and
optimization factor data associated with the pack size and the customer-facing quantity for the products stocked at the at least one retail facility;
providing a computing device including:
a control circuit including a programmable processor and being in communication with the electronic the control circuit being programmed to:
obtain the electronic data from the electronic database; and
cause the electronic data obtained from the electronic database to be processed to estimate a daily demand and a lead time distribution for a selected retail item to be stocked at the at least one retail facility;
a simulator engine executable by the control circuit and programmed to:
download and sort the electronic data transmitted to the simulator engine from the electronic database; and
process the downloaded and sorted data to simulate projected sales, storing costs, and handling costs for the selected retail item to generate at least one simulation data file including electronic simulation data indicating an estimated profit associated with the selected retail item at different total unit quantities in the pack and at different customer facing unit quantities on a product display surface of the at least one retail facility;
an optimizer engine executable by the control circuit and programmed to:
obtain the at least one simulation data file including the electronic simulation data;
obtain the optimization factor data from the electronic database;
correlate the optimization factor data obtained from the electronic database with the at least one simulation data file including the simulation data to generate at least one optimization data file including electronic optimization data representing the total unit quantity in the pack and the customer facing unit quantity on the product display surface of the at least one retail facility estimated to result in a highest net profit margin for the retailer with respect to the selected retail item; and
by the control circuit:
processing the at least one simulation data file and the at least one optimization data file to generate corresponding table format data storage files;
causing the table format data storage files generated by the control circuit to be stored in the electronic database;
associating the table format data storage files stored in the electronic database with a data indexing and visualization platform including a graphical user interface displayed to a user on a display screen of the computing device, wherein the graphical user interface is in a format of a dashboard including one or more interactive menus that, in response to an interaction by the user, cause the data indexing and visualization platform to:

obtain the table format data storage files from the electronic database; and process and extract data from the table format data storage files obtained from the electronic database to generate within the graphical user interface, based on the data extracted from the table format data storage files, a table within the graphical user interface, wherein the table permits the user to retrieve, from the table, the total unit quantity in the pack and the customer facing unit quantity on the product display surface of the at least one retail facility estimated to result in a highest net profit margin for the retailer with respect to the selected retail item.

12. The method of claim 11, wherein the inventory data stored in the electronic database includes historical data reflecting past purchases of the retail products by the retailer from one or more vendors for the at least one retail facility.

13. The method of claim 11, wherein the inventory data stored in the electronic database includes business data indicating a dollar amount indicative of a current net profit associated with the selected retail item, the highest estimated net profit margin for the retailer determined by the control circuit with respect to the selected retail item, and a percentage net profit increase of the highest estimated net profit margin for the retailer determined by the control circuit with respect to the selected retail item in comparison to the current net profit associated with the selected retail item.

14. The method of claim 11,
wherein the data stored in the electronic database further includes worker task data associated with the products stocked at the at least one retail facility; and
wherein the worker task data stored in the electronic database further includes break pack data reflecting a cost to the retailer of having a worker of the retail facility open the pack containing the selected retail item and having the worker of the retail facility transport the selected retail item from an opened pack to the product display surface at the retail facility.

15. The method of claim 11, further comprising storing in the electronic database:
historical data reflecting past sales of the retail products at the at least one retail facility; and
storage capacity data indicating a product display surface capacity of the at least one retail facility.

16. The method of claim 11, wherein the retail sales facility is at least one of a retail store of a retailer and a product distribution center of the retailer.

17. The method of claim 16, wherein the pack size includes at least one of:
vendor pack size representing the total number of units of the selected product in a pack to be received by the product distribution center of the retailer;
a warehouse pack size representing the total number of units of the selected product in a pack to be received by the retail store of the retailer from the product distribution center of the retailer.

18. The method of claim 16, wherein the inventory data stored in the electronic database includes inbound and outbound level data representing a total number of units of the selected product delivered from vendors to the distribution center of the retailer within a selected period of time and a total number of units of the selected product delivered from the distribution center of the retailer to the retail store of the retailer.

19. The method of claim 11, wherein the optimization factor data associated with the pack size and the customer-facing quantity for the products stocked at the at least one retail facility includes at least one optimization factor, the at least one optimization factor including at least one of: capacity limitations of the at least one retail facility; cost of goods to the retailer associated with the products stocked at the at least one retail facility; transportation costs associated with the products stocked at the at least one retail facility; labor and inventory costs associated with the products stocked at the at least one retail facility; inbound lead time associated with the products stocked at the at least one retail facility; outbound lead time associated with the products stocked at the at least one retail facility; and estimated demand level associated with the products stocked at the at least one retail facility.

20. The method of claim 11, wherein the processor of the control circuit is programmed to simulate the projected sales, storing costs, and handling costs for the selected retail item to generate the simulation data based on a Monte Carlo simulation model.

* * * * *